2,063,222

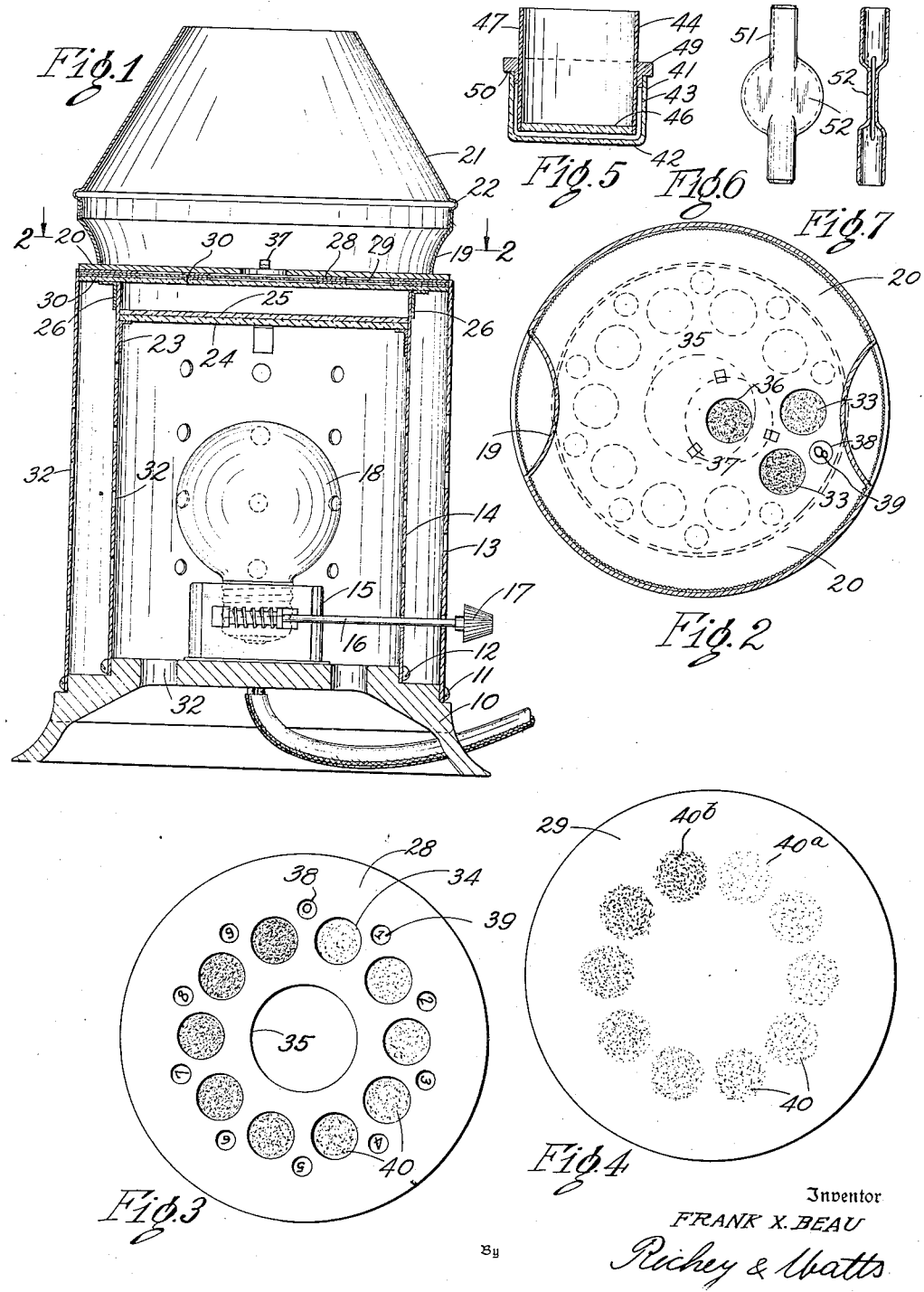
Dec. 8, 1936. F. X. BEAU 2,063,222
APPARATUS FOR INSPECTING FLUIDS
Filed May 17, 1933
Inventor
FRANK X. BEAU
By Richey & Watts
Attorneys Patented Dec. 8, 1936

UNITED STATES PATENT OFFICE 2,063,222

APPARATUS FOR INSPECTING FLUIDS

Frank X. Beau, Cleveland, Ohio

Application May 17, 1933, Serial No. 671,527

11 Claims. (Cl. 88—14)

This invention relates to a method of testing fluids which are laden with insoluble foreign matter, and is further directed to apparatus to facilitate the examination of such materials.

Fluidic lubricants and similar viscous liquids, when circulated within certain types of mechanisms, are susceptible to impregnation with extraneous foreign matter, frequently of an abrasive character which, if permitted to accumulate, will injure the working parts of such mechanism. An example of a fluid containing foreign matter of deleterious character is lubricating oil drawn from a crank case of an automotive vehicle after such lubricant has been subjected to the service requirements of a motor over a substantial period of time. As is well known such crank case oil contains, in addition to certain soluble impurities, variable amounts of finely divided particles of sand, chips and crystalized hydro-carbon residue which cut the journal bearings of the engine and cause undue wear to the working parts thereof.

Although various expedients have been employed to separate such abrasives from the lubricating oil, these efforts are unsatisfactory as the material suspended in the lubricant is of such minute character that physical separation is impossible. It has become the custom of motor vehicle operators, therefore, to discard the used fluidic lubricant after the engine has been in service over a certain operative period, irrespective of the abrasive content of the lubricant. Such practice, however, is frequently wasteful and is unsatisfactory since the lubricant may become laden with foreign matter in a much shorter period than that specified, for example, in a new automobile engine which has not been thoroughly flushed by the builder, the oil may accumulate particles of molding sand from the interior surfaces of the castings in a relatively short time and in an engine having worn pistons, incomplete combustion or defective air breathers, the lubricant may likewise be unfit for use long before the specified "change" period.

To avoid the hazards of the foregoing practice it is desirable to provide a means to determine the degree of foreign matter held in suspension in a lubricant or similar fluidic substances and through such examination thereof to determine when such material should be discarded.

One of the objects, therefore, of the present invention is to provide apparatus which will facilitate the inspection of contaminated fluids to determine the amount of foreign matter therein by the comparison with a standard of known density.

The invention further contemplates an improved and more comprehensive method of inspecting and gradating the fluid through the translucency thereof relative to standards of known translucent density.

In the drawing wherein there is illustrated one form of apparatus adapted for use in conjunction with the method of inspection embodied in the present invention—

Figure 1 is a vertical sectional view of the preferred form of the device.

Figure 2 is a transverse sectional view of the device shown in Figure 1, the section being taken on a plane indicated by the line 2—2 in Figure 1.

Figure 3 is a detail plan view of a plate used in conjunction with a density standard employed in the device constituting the present embodiment.

Figure 4 is a detail plan view of the density standard.

Figure 5 is a vertical sectional view of a receptacle for the specimen of the fluid to be examined.

Figure 6 illustrates the front elevational view of a modified form of container.

Figure 7 illustrates a longitudinal sectional view of the container shown in Figure 6.

Referring to Figure 1 the apparatus herein chosen to illustrate the invention comprises a base 10 preferably formed with concentric ledges 11 and 12 to receive and support respectively cylinders 13 and 14. Upon the upper face of the base 10 there is mounted an electrical socket 15 which is preferably provided with a rheostat or similar device to facilitate the variable intensity of light emitted from a lamp mounted therein. As shown the socket 15 is provided with a shaft 16 having a knurled knob 17 thereon for controlling the rheostat in the socket. Within the socket 15 there is an incandescent light bulb 18 which may be colored to effect the desired appearance of fluid to be examined relative to the density standard employed in the apparatus. The outer chamber 13 is formed, adjacent its upper end, with opposed depressed wall portions 19 which are slotted to receive an annular disc 20. The marginal portions of the disc which extend through the apertures and beyond the concave walls 19 facilitate the rotative adjustment of the disc within the cylinder. The upper portion of the cylinder 13 is provided with a frustro-conical cap 21 which is telescopically engageable with the cylinder and supported thereon by a bead or lip 22.

The inner cylinder 14 is provided adjacent the upper end thereof with flanged clips 23 adapted to support a translucent plate or lens 24 and a color filter plate 25. On the outer perimeter of the cylinder 14 there is a flange 26 which is arranged to support an apertured plate 28, the density standard 29 and a plate 30, similar in form to the plate 28. The disc 20 is supported by the plate 30 and is sustained against vertical movement within the chamber 13 by the depressed wall portions 19 of the casing 13.

The base 10, as well as the vertical walls of the cylinders 13 and 14, are provided with apertures 32 to permit dissipation of heat from the chambers formed by the cylinders 13 and 14. Within the disc 20 there is a pair of openings 33 which are radially and circumferentially spaced for registration with a series of apertures 34 in the plate 28. In the center of the plate 28 there is a relatively large opening 35 which is circumambient an opening 36 in the disc 20 during the revolved adjustment thereof. Adjacent the opening 36 there is a plurality of flanged guide blocks 37 which are adapted to support the receptacle provided to contain the fluid to be inspected.

Intermediate the openings 33 there is an aperture 38 which is disposed to register, upon the rotative adjustment of the disc 20, with a series of numerical characters of reference 39 marked upon the surface of the disc 30.

The density standard 29 may be made from any suitable material which is inherently translucent or which may be coated to provide a series of segments of progressively variable translucent density. In the present embodiment the standard is made from a photographic film, portions whereof have been subjected to exposure at variable time intervals to effect a series of areas 40 of progressively variable translucent density, as will be noted by comparison of the areas 40a and 40b diagrammatically illustrated in Figure 4. The areas 40 are arranged radially in relation to the apertures 34, and circumferentially spaced in registration therewith.

To arrive at the proper calibration for a particular scale of measurements, a series of photographic films are exposed and developed under accurate methods of control, to different depths or densities. The depth or density of each particular film or film area prepared is permanently indexed and accurately tabulated according to its evaluation in depth or density. Such method permits production and reproduction of thousands of photographic films of different depths or densities. To properly install a density standard of evaluated measurement and to calibrate the device for a particular field of operation, a uniform thickness of each of the predetermined samples of fluid may be put into as many separate containers or units (Fig. 5), two at a time, and in the progressive order of the fluid samples the two specified containers or units are placed over the two consecutive unfilled openings 33 in disc 20 inside of the device. Over unfilled opening 36 of disc 20 is placed, one at a time, various prepared films or film areas until one is found of a depth or light restricting density through which, when the intensification of the light source is gradually increased or decreased, the light rays will become visible or invisible in the sequential order of: first, through one of the predetermined fields of fluid; second, through the photographic field or film; and third, through the second predetermined field of fluid. When a film or film area is found to have the evaluated light restricting depth or density as outlined above, the index number of that particular film or film area is recorded and that particular light restricting density is established as the calibration for one of the segments of density for density standard film 29. After the last described phase is completed, the required light restricting density for each segment of evaluation density standard 29 is known, and the latter may therefore be installed as a unit. The series of densities for covering a given range in terms of proportion of suspended matter having been prepared and installed in proper order on the screen plate 28, it is then possible to identify, by ocular inspection of light restriction, the proportion of suspended matter in an unknown sample, by interpolation between two known proportions, between which the unknown lies. The degree of accuracy is determined by the closeness of the densities of adjacent or successive densities of the standard films described herein.

As illustrated in Figure 5 the fluid receptacle 41 comprises a cup having a transparent bottom 42 and side walls 43. Within the cup 41 there is a plunger 44 which is likewise formed with a transparent bottom plate 46 and constructed with opaque side walls 47. The plunger 44 is provided with a collar 49 which is formed with a shoulder 50 adapted for engagement within the cup 41 to maintain the alignment of the plunger therein. The bottom of the plunger when assembled within the cup is disposed relatively close to the bottom wall of the cup in order to provide a thin film of fluid between the glass end walls of the cup 41 and plunger 44. In use a few drops of fluid are placed in the cup 41 and as the plunger is assembled therein a portion of such fluid will be displaced and rises in the chamber formed intermediate the walls of the plunger and cup, thus forming a film of fluid which is uniform in thickness for every inspection event. The collar 49 may be mounted for vertical adjustment upon the plunger so that the thickness of the film of fluid may be modified if desired.

Alternate or equivalent forms of fluid containers having constant volumetric capacity with respect to the film thickness, may be substituted for the receptacle above described. In Figure 6 a modified form of such container is illustrated. This embodiment comprises a glass tube 51 flattened intermediate its ends to form a relatively narrow chamber 52 through which the fluid may be drawn by means of a suitable vacuum pump or pipette. The instrument constituting such embodiment may be used to draw the specimen of fluid to be examined from the source and the instrument in its entirety or the tube 51 per se may be arranged over the opening 36 for inspection purposes.

In operation a specimen of the fluid to be examined is deposited in the transparent receptacle which in turn is disposed upon the supporting blocks or holders 37. The intensity of the incandescent lamp is then adjusted through the control stem 17 until the light beam admitted through the lens 24, filter 25 and central opening 36 in the plates 28 and 30, respectively, effects the hue or shade which is best suited for comparison. For instance, the deepest shade which may be detected visually by the operator. The disc 20 is then progressively revolved from the less translucent area 40a towards the segment 40b having the maximum density. During the revolution of the disc 20 a position will be found which by comparison with the light beam penetration through the contiguous opening 33 will most nearly approach the appearance of the light diffusion through the fluid specimen contained within the receptacle 41, or more specifically, the light admitted through the translucent specimen may be compared with the appearance of the segments 40 until the position is established where the shade is intermediate two contiguous areas 40 which define the high and low limits of a zone of known translucent density. The foreign material content of the specimen may thus be evaluated relative to such limits and the fluid specimen gradated by reference to the identification numerals 39.

Since certain lubricants vary in color due to various methods of refinement, it is essential to provide a colored incandescent bulb or filter, such as the plate 25, in order to eliminate certain light rays which in the presence of neutral light accentuate the tone or shade of certain colors. In lubricating oil of various types it has been found that a red light neutralizes the color of the oil and gives superior results. By filtering certain light rays from the medium of illumination a more uniform analysis of the specimen may be obtained notwithstanding the predominating color thereof.

By reference to illustration in Figure 2 it will be seen that the light penetration through the fluid specimen effects a shade, the appearance whereof is intermediate the shade limits established in the contiguous areas 33 appearing through the openings in the disc. It is obvious that by further rotative adjustment of the disc 20 the fluid under examination may be positioned so that the translucent density thereof may be intermediate the density limits provided in each contiguous area 20 of the density standard, as heretofore described.

The numerals or characters 39 which are exposed to vision during the rotative movement of the disc 20 may be used to indicate the point of acceptance or rejection of the fluid under examination as established by some predetermined analysis or as a result of practical experimentation.

In the foregoing description reference has been specifically made to motor vehicle lubricants. It is to be understood, however, that other fluids having particles of foreign matter suspended therein may be likewise inspected in an examination of this character and with apparatus of this type, particularly when it is desired to ascertain the degree of foreign matter which would have a deleterious result on the apparatus or materials with which such fluid is used. An example thereof is insoluble material in a cleaning fluid or foreign matter which would impair the dissipation of heat in apparatus employing a fluid as a cooling agent.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. A device for testing fluids containing insoluble material held in suspension comprising an electric light socket having a dimming device therein, a colored electric light bulb in said socket, a transparent receptacle adapted to contain a film of a predetermined thickness of the fluid to be tested, a photographic plate having areas of variable translucency, an apertured disc disposed intermediate the light and the fluid receptacle and adapted to support said receptacle, and means for adjusting said disc over said plate so that the translucency of various areas of the said photographic plate may be compared with the translucency of the film of said fluid.

2. An apparatus for inspecting fluids such as used lubricating oil comprising a housing, an electric light therein, a disc having openings therein rotatively mounted above said light, a transparent receptacle for containing a film of oil to be inspected mounted upon said disc above one of the openings therein, a density standard interposed between said light and said disc, a portion of said density standard being transparent to permit admission of light to said receptacle and other portions of said density standard comprising translucent areas of progressively intensified density arranged for registration with other openings in said disc, and means associated with said light for controlling the intensity thereof to facilitate determination of the translucency of the oil and areas exposed through the openings in the disc when the disc is rotatively adjusted over the density standard.

3. A device for testing fluids containing material held in suspension, comprising an incandescent lamp, a color filter thereover, an apertured plate mounted above said filter, a translucent density standard superimposed upon said plate, said density standard embodying a series of light restricting areas of progressive translucent density, a rotatable disc mounted above said density standard and having openings therein disposed for registration with certain of the apertures in said plate, a fluid receptacle detachably mounted upon said disc, said receptacle comprising a cup, a transparent end wall, a plunger adapted for reception therein, a transparent end wall in said plunger, and means associated with said plunger to maintain the respective end walls of the cup and plunger in spaced relation.

4. A device for testing fluids containing material held in suspension, comprising a source of light, a density standard mounted thereover, a disc rotatably mounted above said density standard and having a pair of spaced openings therein, a transparent receptacle adapted to contain a film of the fluid to be tested, said receptacle being mounted upon said disc, and means to facilitate admission of the light through the film of said fluid while the disc is rotatively adjusted thereover to determine areas within the density standard which, as viewed through the said pair of openings in said disc, are comparable to the translucency of said film of fluid.

5. An apparatus for testing fluids such as used lubricating oil comprising a chamber, a light therein, a density standard embodying areas of stepped translucency, a rotatable disc thereupon, a transparent receptacle mounted upon said disc and formed to contain a film of predetermined thickness of said oil, said disc having openings therethrough, two of which are radially disposed for registration with said translucent areas of said density standard and a third opening disposed to admit light to said receptacle whereby the translucency of the oil film may be compared with the translucency of areas of the density standard as the disc is revolved thereover.

6. An apparatus for testing used lubricating oil comprising a light, a density standard thereover, an apertured disc superimposed upon said density standard, and a transparent receptacle upon said disc for containing a film of said oil, the apertures in said disc being disposed for registration with contiguous areas of variated translucency in said density standard and a transparent area therein and being adjustably mounted so that the light penetration through the oil and a pair of the contiguous areas of the density standard may be visually compared.

7. In combination with apparatus for testing fluids such as used lubricants embodying a light of variable intensification, an apertured disc and a transparent receptacle for holding a film of the used lubricant, a density standard comprising a photographic plate having a series of separated areas thereon of progressively stepped translucency disposed for registration with said apertures in said disc, said density standard also having a transparent area arranged in relation to the light and the said receptacle to permit light penetration therethrough whereby comparison may be made between the said film of used lubricant and simultaneously with at least two of the said separated areas of variable intensification in said density standard.

8. An apparatus for testing fluids such as used lubricating oil comprising a housing, an electric light therein, a density standard disposed within said housing above said light, sectional areas in said density standard of variated translucency, an apertured disc above said density standard, a transparent receptacle for containing a film of oil to be tested mounted on said disc, the apertures in said disc being disposed to admit light through said oil film and through at least two of the translucent areas of the plate to accommodate the visual comparison thereof.

9. A device for testing fluids such as used lubricating oil comprising a density standard having segments of multi-varied translucent density, a disc having openings therein superimposed on said density standard, a transparent receptacle for containing a film of oil mounted on said disc, an incandescent light bulb, means to control the intensity thereof, and means for adjusting the position of the said disc so the light from said bulb will penetrate two contiguous openings in said disc and the said film of oil to facilitate the comparison of the translucency of the oil with the density standard.

10. Apparatus for testing fluids to determine the percentage of suspended matter therein comprising: a housing, a light source mounted therein, means for adjusting the intensity of the light rays emitted from said source, a density standard mounted in said housing over said light source and embodying a plurality of progressively-stepped light-restricting fields whose densities are calibrated in terms of suspended matter, a transparent receptacle containing a sample of predetermined thickness of the fluid to be tested supported over said standard, means for neutralizing the colors of said fields and said sample, a member mounted in said housing having openings therein arranged between said fields and sample, said member functioning as an iris to restrict the fields visible to an operator to any selected pair of stepped fields, the density of said sample with respect to said fields being determined by varying the intensity of said rays and observing the sequence of visibility or invisibility of the rays through said fields and sample.

11. Apparatus for testing fluids to determine the percentage of suspended matter therein comprising: a housing, a light source mounted therein, means for adjusting the intensity of the light rays emitted from said source, a density standard mounted in said housing over said light source and embodying a plurality of progressively-stepped light-restricting fields whose densities are calibrated in terms of suspended matter, a transparent receptacle containing a sample of gauged thickness of the fluid to be tested, an adjustable iris member mounted in said housing over said standard, means for supporting said receptacle on the iris member, and a color filter for neutralizing the colors of said fields and sample, the density of said sample with respect to said fields being determined by adjusting said iris member while gradually increasing or decreasing the intensity of the light rays and observing the sequence of visibility or invisibility of the rays through any selected pair of said stepped fields and said sample.

FRANK X. BEAU.